United States Patent
Liu et al.

(10) Patent No.: US 12,361,691 B2
(45) Date of Patent: Jul. 15, 2025

(54) VEHICLE RECOGNITION METHOD AND APPARATUS, DEVICE, AND STORAGE MEDIUM

(71) Applicant: INSPUR (BEIJING) ELECTRONIC INFORMATION INDUSTRY CO., LTD., Beijing (CN)

(72) Inventors: Hongli Liu, Beijing (CN); Feng Li, Beijing (CN); Xin Liu, Beijing (CN)

(73) Assignee: INSPUR (BEIJING) ELECTRONIC INFORMATION INDUSTRY CO., LTD., Beijing (CN)

( * ) Notice: Subject to any disclaimer, the term of this patent is extended or adjusted under 35 U.S.C. 154(b) by 396 days.

(21) Appl. No.: 17/924,854

(22) PCT Filed: Jan. 23, 2021

(86) PCT No.: PCT/CN2021/073446
§ 371 (c)(1),
(2) Date: Nov. 11, 2022

(87) PCT Pub. No.: WO2021/238262
PCT Pub. Date: Dec. 2, 2021

(65) Prior Publication Data
US 2023/0196744 A1 Jun. 22, 2023

(30) Foreign Application Priority Data
May 29, 2020 (CN) .......................... 202010476802.5

(51) Int. Cl.
*G06V 10/776* (2022.01)
*G06V 10/774* (2022.01)
(Continued)

(52) U.S. Cl.
CPC .......... *G06V 10/776* (2022.01); *G06V 10/774* (2022.01); *G06V 10/778* (2022.01);
(Continued)

(58) Field of Classification Search
CPC .. G06V 10/776; G06V 10/774; G06V 10/778; G06V 10/82; G06V 20/54;
(Continued)

(56) References Cited

U.S. PATENT DOCUMENTS

| | | | |
|---|---|---|---|
| 2019/0026639 A1* | 1/2019 | Vasudevan | G06N 3/08 |
| 2019/0156211 A1* | 5/2019 | Dong | G06N 3/04 |

(Continued)

FOREIGN PATENT DOCUMENTS

| | | |
|---|---|---|
| CN | 110705573 A | 1/2020 |
| CN | 110889487 A | 3/2020 |
| CN | 111738098 A | 10/2020 |

OTHER PUBLICATIONS

PCT/CN2021/073446 international search report.

*Primary Examiner* — Van D Huynh
(74) *Attorney, Agent, or Firm* — IPro, PLLC

(57) ABSTRACT

A vehicle recognition method includes: acquiring a training set including multiple vehicle images which includes vehicles at a designated crossroad and corresponding vehicle information; performing learning and sampling by a neural network to obtain a subnetwork model and determining same as a current model, and training the current model by using the training set to obtain reward parameters; calculating a constraint condition value of the current model, calculating a reward value on the basis of the constraint condition value and the reward parameters, updating trainable parameters of the neural network by using the reward value, and returning to execute the operation of obtaining the subnetwork model until a preset condition is reached; after the preset condition is reached, selecting an optimal network model; and inputting a vehicle picture to be recognized into the optimal network model, to obtain vehicle information of the vehicle picture to be recognized.

20 Claims, 5 Drawing Sheets

(51) Int. Cl.
*G06V 10/778* (2022.01)
*G06V 10/82* (2022.01)
*G06V 20/54* (2022.01)

(52) U.S. Cl.
CPC .............. *G06V 10/82* (2022.01); *G06V 20/54* (2022.01); *G06V 2201/08* (2022.01)

(58) Field of Classification Search
CPC .............. G06V 2201/08; G06V 10/764; G06F 18/214; G06N 3/045; G06N 3/08; G08G 1/0116; G08G 1/0145; G08G 1/0175
See application file for complete search history.

(56) References Cited

U.S. PATENT DOCUMENTS

| | | | |
|---|---|---|---|
| 2020/0007781 A1 | 1/2020 | Aoba | |
| 2020/0189590 A1* | 6/2020 | Luo | G06N 3/08 |
| 2020/0192390 A1* | 6/2020 | Luo | G05D 1/0221 |
| 2021/0182664 A1* | 6/2021 | Kim | G06N 3/08 |
| 2021/0355884 A1* | 11/2021 | Chae | B60K 35/10 |
| 2022/0019855 A1* | 1/2022 | Chen | G06V 10/776 |
| 2022/0319154 A1* | 10/2022 | Zhang | G06N 3/006 |

\* cited by examiner

VEHICLE RECOGNITION METHOD AND APPARATUS, DEVICE, AND STORAGE MEDIUM

CROSS-REFERENCE TO RELATED APPLICATIONS

The present disclosure claims the priority of the Chinese patent disclosure filed on May 290, 2020 before the Chinese Patent Office with the disclosure number of 202010476802.5 and the title of "VEHICLE RECOGNITION METHOD AND APPARATUS, DEVICE, AND STORAGE MEDIUM", which is incorporated herein in its entirety by reference.

FIELD

The present disclosure relates to the technical field of intelligent transport and more particularly, to a vehicle recognition method, an apparatus, a device, and a storage medium.

BACKGROUND

For recognition of vehicles at intelligent transport crossroads, cameras are usually used to shoot the vehicles at the crossroads, and then a manually pre-trained model is used for performing vehicle recognition on the captured images, to obtain vehicle information included in the images. However, the inventor found that, at present, the manually trained model has the problems of low accuracy and poor recognition performance when realizing the vehicle information acquisition of the images, that is, which may also be called realizing the vehicle recognition.

SUMMARY

The present disclosure is aimed at providing a vehicle recognition method and apparatus, device, and a storage medium, which may greatly improve the recognition precision and the recognition performance of the vehicle recognition.

In order to realize the above purpose, the present disclosure provides the following technical solutions:

a vehicle recognition method, including:

acquiring a training set, wherein the training set includes a plurality of vehicle images and corresponding vehicle information, and the vehicle images in the training set contain vehicles located at a designated crossroad;

performing learning and sampling by a neural network to obtain a subnetwork model, determining the subnetwork model to be a current model, and training the current model by using the training set to obtain reward parameters, wherein the reward parameters include a training set precision or a total number of times of training the subnetwork model;

calculating a constraint condition value of the current model, calculating a reward value based on the constraint condition value and the reward parameters, updating trainable parameters of the neural network by using the reward value, returning to perform the operation of using a neural network for learning and sampling to obtain a subnetwork model until a preset condition is reached; and after the preset condition is reached, selecting an optimal network model from all subnetwork models; and on the condition that a vehicle recognition is required to be realized, inputting vehicle images to be recognized to the optimal network model, to obtain vehicle information of the vehicle images to be recognized outputted by the optimal network model.

In an embodiment of the present disclosure, the method further includes:

acquiring a validation set, wherein the validation set includes a plurality of vehicle images and corresponding vehicle information, and the vehicle images in the validation set contain vehicles located at a designated crossroad;

after training the current model by using the training set to obtain reward parameters, the method further includes:

validating the current model by using the validation set to obtain a validation set precision;

calculating a reward value based on the constraint condition value and the reward parameters includes:

calculating the reward value reward according to the following formulas:

$$\text{reward} = ACC_{valid}(m) \times \left[\frac{\text{Constraints}(m)}{C}\right]^w$$

$$\text{s.t. } w = -\beta * \text{relu}(\tanh(\alpha(T_m - T_0)))$$

wherein, m represents the current model, $ACC_{valid}(m)$ represents the validation set precision of the current model, Constraints(m) represents the constraint condition value of the current model, C represents a preset threshold of the constraint condition value, w represents an exponential coefficient of the constraint condition value, $w \in [-\beta, 0]$, $\beta$ represents a zoom factor of w, $\beta > 0$, $\tanh \in (-1, 1)$ represents a monotone increasing hyperbolic tangent function, relu represents an activation function, $\text{relu} \geq 0$, $T_0$, $\alpha$, and $\beta$ are externally settable hyperparameters, $T_m$ represents the total number of times or the training set precision corresponding to the current model, on the condition that $T_m$ represents the total number of times corresponding to the current model, $T_0$ represents a preset first time threshold, $T_0 > 0$, $\alpha$ represents a zoom factor of the total number of times corresponding to the current model, $\alpha \in (0,1)$, on the condition that $T_m$ represents the training set precision corresponding to the current model, $T_0$ represents a preset precision threshold, $T_0 < 1$, $\alpha$ represents a zoom factor of the training set precision corresponding to the current model, and $\alpha \geq 1$.

In an embodiment of the present disclosure, updating trainable parameters of the neural network by using the reward value includes:

updating the trainable parameters of the neural network according to the following formula:

$$\theta \leftarrow \theta + \gamma \nabla_\theta \log \pi_\theta(s_t, a_t) \cdot R_t$$

wherein, $\theta$ represents the trainable parameters of the neural network, $\gamma$ represents a preset parameter, $\gamma \nabla_\theta$ represents backpropagation gradients of the trainable parameters, $\log \pi_\theta(s_t, a_t)$ represents a cross-entropy of the subnetwork model obtained at the t-th time, and $R_t$ represents the reward value calculated after obtaining the subnetwork model at the t-th time.

In an embodiment of the present disclosure, training the current model by using the training set to obtain reward parameters includes:

training the current model by using part of the vehicle images and corresponding vehicle information included in the training set;
after selecting an optimal network model from all subnetwork models, the method further includes:
training the optimal network model by using all vehicle images and corresponding vehicle information included in the training set.

In an embodiment of the present disclosure, the method further includes:
acquiring a testing set, wherein the testing set includes a plurality of vehicle images and corresponding vehicle information, and the vehicle images in the testing set contain vehicles located at a designated crossroad;
after training the current model by using the training set to obtain reward parameters, the method further includes:
testing the current model by using the testing set to obtain a testing set precision;
selecting an optimal network model from all subnetwork models includes:
selecting a subnetwork model with a highest testing set precision from all subnetwork models, and determining the subnetwork model with the highest testing set precision as the optimal network model.

In an embodiment of the present disclosure, determining whether the preset condition is reached includes:
determining whether the total number of times of currently training the subnetwork model reaches a second time threshold, if it is determined that the total number of times of currently training the subnetwork model reaches a second time threshold, determining that the preset condition is reached; if it is determined that the total number of times of currently training the subnetwork model does not reach a second time threshold, determining that the preset condition is not reached.

In an embodiment of the present disclosure, after obtaining vehicle information of the vehicle images to be recognized outputted by the optimal network model, the method further includes:
on the condition that the vehicle information of the vehicle image to be recognized indicates that a total quantity of the vehicles included in the vehicle image is greater than a quantity threshold, outputting prompt information that the traffic flow is too heavy.

A vehicle recognition apparatus, and the apparatus includes:
a first data acquisition module, configured for acquiring a training set, wherein the training set includes a plurality of vehicle images and corresponding vehicle information, and the vehicle images in the training set contain vehicles located at a designated crossroad;
a model acquisition module, configured for using a neural network for learning and sampling to obtain a subnetwork model, determining the subnetwork model to be a current model, and training the current model by using the training set to obtain reward parameters, wherein the reward parameters include a training set precision or a total number of times of training the subnetwork model; calculating a constraint condition value of the current model, calculating a reward value based on the constraint condition value and the reward parameters, updating trainable parameters of the neural network by using the reward value, returning to perform the operation of using a neural network for learning and sampling to obtain a subnetwork model until a preset condition is reached; and after the preset condition is reached, selecting an optimal network model from all subnetwork models; and
a vehicle recognition module configured for, on the condition that a vehicle recognition is required to be realized, inputting vehicle images to be recognized to the optimal network model, to obtain vehicle information of the vehicle images to be recognized outputted by the optimal network model.

A vehicle recognition device, and the device includes:
a memory, configured for storing a computer program; and
a processor, configured for implementing the operations of the vehicle recognition method according to any one of the above descriptions.

A computer-readable storage medium, and a computer program is stored on the computer-readable storage medium, and when the computer program is executed by a processor, the operations of the vehicle recognition method according to any one of the above descriptions are implemented.

The present disclosure provides a vehicle recognition method and apparatus, device, and a storage medium, the method includes: acquiring a training set, wherein the training set includes a plurality of vehicle images and corresponding vehicle information, and the vehicle images in the training set contain vehicles located at a designated crossroad; using a neural network for learning and sampling to obtain a subnetwork model, determining the subnetwork model to be a current model, and training the current model by using the training set to obtain reward parameters, wherein the reward parameters include a training set precision or a total number of times of training the subnetwork model; calculating a constraint condition value of the current model, calculating a reward value based on the constraint condition value and the reward parameters, updating trainable parameters of the neural network by using the reward value, returning to perform the operation of using a neural network for learning and sampling to obtain a subnetwork model until a preset condition is reached; and after the preset condition is reached, selecting an optimal network model from all subnetwork models; and on the condition that a vehicle recognition is required to be realized, inputting vehicle images to be recognized to the optimal network model, to obtain vehicle information of the vehicle images to be recognized outputted by the optimal network model. It may be seen that, in the present disclosure, a model training used for vehicle recognition is automatically implemented by using the vehicle images captured at the designated crossroads and the vehicle information, and adaptive constraint conditions are incorporated into the model search process during the training process, which may adjust constraint adaptively according to feedbacks from the training process. Therefore, a model with higher accuracy and better recognition performance may be obtained by training to the greatest extent under the constraint conditions, and using the model to realize the vehicle recognition may greatly improve the recognition precision and the recognition performance.

BRIEF DESCRIPTION OF THE DRAWINGS

In order to more clearly illustrate the technical solutions of the embodiments of the present disclosure or the prior art, the figures that are required to describe the embodiments or the prior art will be briefly introduced below. Apparently, the figures that are described below are embodiments of the present disclosure, and a person skilled in the art may obtain other figures according to these figures without paying creative work.

DETAILED DESCRIPTION

The technical solutions of the embodiments of the present disclosure will be clearly and completely described below with reference to the drawings of the embodiments of the present disclosure. Apparently, the described embodiments are merely certain embodiments of the present disclosure, rather than all of the embodiments. All of the other embodiments that a person skilled in the art obtains on the basis of the embodiments of the present disclosure without paying creative work fall within the protection scope of the present disclosure.

Figure 1:
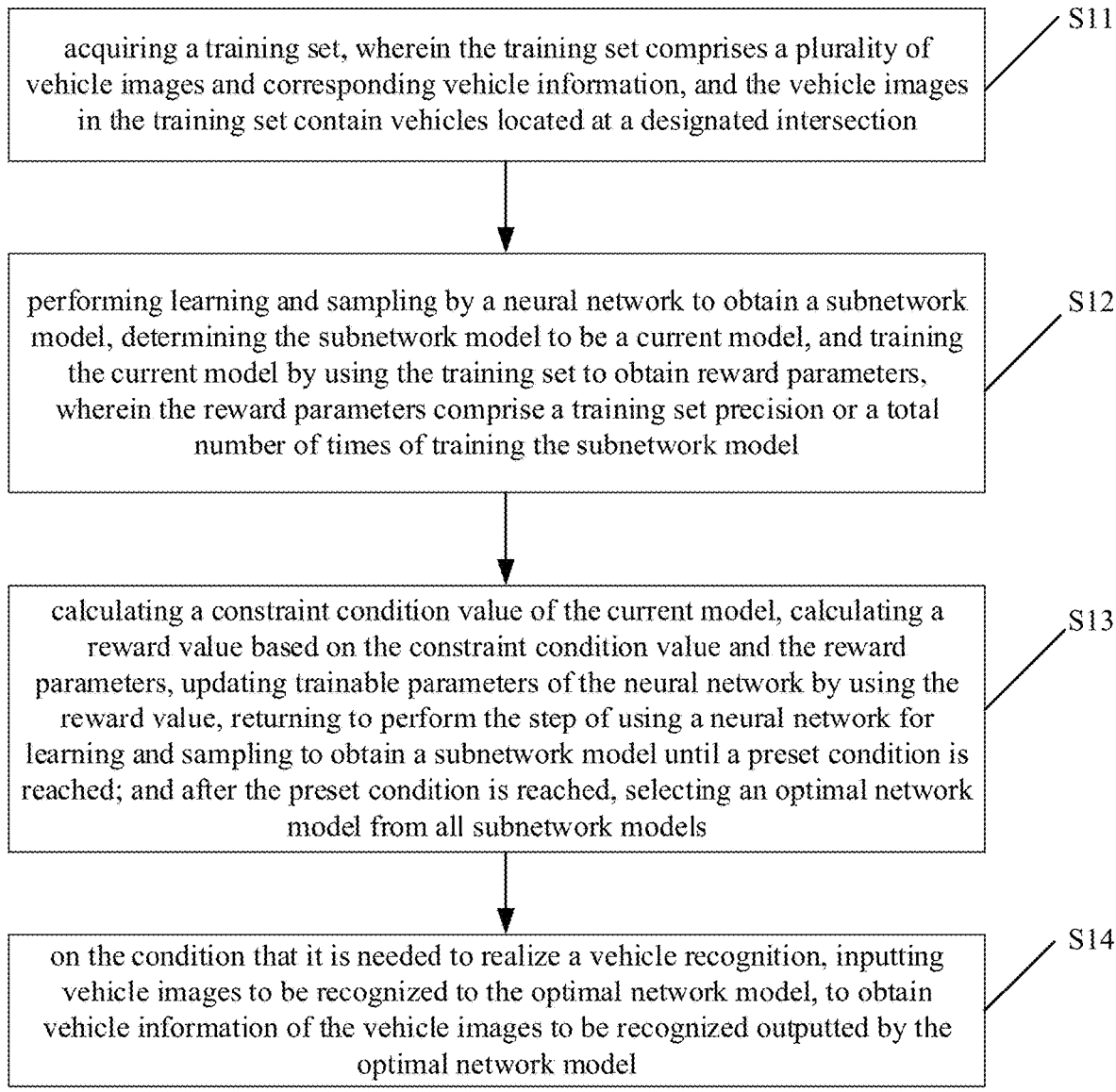
FIG. 1 is a flow chart of a vehicle recognition method according to an embodiment of the present disclosure.

Referring to FIG. 1, it shows a flow chart of a vehicle recognition method according to an embodiment of the present disclosure, the method may include:

S11: acquiring a training set, wherein the training set includes a plurality of vehicle images and corresponding vehicle information, and the vehicle images in the training set includes vehicles at a designated crossroad.

It should be noted that, an executive body of the vehicle recognition method provided by the embodiment of the present disclosure may be a vehicle recognition apparatus. First, an initialization input is performed, the initialization input includes configuring hyperparameters and reading a data set from a database thereof. The hyperparameters may include subnetwork hyperparameters and controller hyperparameters, and the subnetwork hyperparameters may mainly include an amount of layers of the subnetwork (the amount of layers of the subnetwork is an amount of cells (neurons)), an amount of cell branches, parameters related to a model learning rate (the parameters related to the model learning rate such as a decay rate in exponential decay, decay steps, etc.) and an amount of output channels, etc.; since a controller in the present disclosure uses a neural network (such as a Recurrent Neural Network (RNN)), the controller hyperparameters may mainly include an amount of layers of the neural network (the amount of layers of the neural network is the amount of cells), the amount of cell branches, the parameters related to the model learning rate (the parameters related to the model learning rate such as the decay rate in exponential decay, the decay steps, etc.) and the amount of the output channels, etc.; while the data set may include a training set, a validation set and a testing set, the training set, the validation set and the testing set may all include vehicle images and corresponding vehicle information, the vehicle images are images obtained by shooting and including vehicles located at a crossroad (a designated crossroad) needed to realize the vehicle recognition, the vehicle information may include total amount of the vehicles, vehicle models, vehicle colors, etc., and the vehicle images included in the training set, the vehicle images included in the validation set and the vehicle images included in the testing set may be different from each other, thereby increasing the effectiveness of corresponding training, validation and testing.

S12: performing learning and sampling by a neural network to obtain a subnetwork model, determining the subnetwork model to be a current model, and training the current model by using the training set to obtain reward parameters, wherein the reward parameters include a training set precision or a total number of times of training the subnetwork model.

In the present disclosure, the neural network is used as the controller, the controller may learn and sample to output a subnetwork architecture, then use a preset decoder to decode the subnetwork architecture into the subnetwork model that is capable of being recognized by a vehicle recognition device, that is, to use the neural network to learn and sample to obtain the subnetwork model. The difference between the subnetwork architecture and the subnetwork model is just that the subnetwork architecture cannot be recognized by the vehicle recognition apparatus, but the subnetwork model can be recognized by the vehicle recognition apparatus; the operations of using the neural network to learn and sample to obtain the subnetwork model are consistent with the implementation principles of the corresponding solutions in the related art, which are not repeated here. After the subnetwork model is obtained by using the neural network, the subnetwork model may be trained on the training set to obtain the training set precision of the subnetwork model on the training set and the total number of times of training the subnetwork model; wherein, the total number of times of training the subnetwork model is the total number of times of training the subnetwork model from the first time when the subnetwork model is obtained to a current moment, it may also be called a global step (step size); the current value of the total number of times may be set to 0, and after each training of the subnetwork model, a current value of the total number of times before each training plus 1 is regarded as the current value of the total number of times, so as to realize the statistics of the total number of times of training the subnetwork model.

S13: calculating a constraint condition value of the current model, calculating a reward value based on the constraint condition value and the reward parameters, updating trainable parameters of the neural network by using the reward value, returning to perform the operation of using a neural network for learning and sampling to obtain a subnetwork model until a preset condition is reached; and after the preset condition is reached, selecting an optimal network model from all subnetwork models.

It should be noted that, the constraint condition generally refers to indicators that measure an operating speed of the model, such as floating-point operations (FLOPs), model parameters, interface delays, etc., under the premise of a known model, a value of the constraint condition of the model may be obtained by performing corresponding calculations, that is, the constraint condition value. After calculating the constraint condition value of the current model, the reward value of the current model may be calculated based on the constraint condition value and the reward parameters, and then the trainable parameters of the neural network may be updated by using the reward value, to enable the neural network to be capable of learning and sampling to obtain a better subnetwork architecture. In addition, after reaching the preset condition set according to actual needs, returning to the operation of obtaining the subnetwork model may be stopped, that is, the model search process is stopped, while one optimal subnetwork is selected from all subnetwork models obtained by using the neural network to be regarded as the optimal network model for realizing the vehicle recognition.

S14: on the condition that a vehicle recognition is required to be realized, inputting vehicle images to be recognized to the optimal network model, to obtain vehicle information of the vehicle images to be recognized outputted by the optimal network model.

On the condition that it is needed to realize the vehicle recognition, corresponding vehicle images may be inputted into the optimal network model, and the optimal network model may automatically output the vehicle information of the vehicle images after analyzing the vehicle images by the optimal network model.

In the technical solution of the present disclosure, after using the neural network for learning and sampling to obtain a subnetwork model which is regarded as the current model, the current model is trained by using the training set which includes the vehicle images of the designated crossroad and corresponding vehicle information, to obtain the reward parameters including the training set precision or the total number of times of training the subnetwork model. The reward value is calculated based on the constraint condition value and the reward parameters, the trainable parameters of the neural network is updated by using the reward value, the operation of using the neural network for learning and sampling to obtain the subnetwork model is returned to be performed, and after the preset condition is reached, the optimal network model from all subnetwork models is selected; on the condition that a vehicle recognition is required to be realized, the vehicle images to be recognized is inputted to the optimal network model, to obtain vehicle information of the vehicle images to be recognized outputted by the optimal network model. It can be seen that, in the present disclosure, a model training used for vehicle recognition is automatically implemented by using the vehicle images captured at the designated crossroads and the vehicle information, and adaptive constraint conditions are added into the model search process during the training process, which may adjust constraint adaptively according to feedbacks during the training process. Therefore, a model with higher accuracy and better recognition performance may be obtained by training to the greatest extent under the constraint conditions, and using the model to realize the vehicle recognition may greatly improve the recognition precision and the recognition performance.

The vehicle recognition method provided by the embodiment of the present disclosure may further include:

acquiring a validation set, wherein the validation set includes a plurality of vehicle images and corresponding vehicle information, and the vehicle images in the validation set include vehicles located at a designated crossroad;

after training the current model by using the training set to obtain reward parameters, the method may further include:

validating the current model by using the validation set to obtain a validation set precision;

calculating a reward value based on the constraint condition value and the reward parameters includes:

calculating the reward value reward according to the following formulas:

$$\text{reward} = ACC_{valid}(m) \times \left[\frac{\text{Constraints}(m)}{C}\right]^w$$

$$\text{s.t. } w = -\beta * \text{relu}(\tanh(\alpha(T_m - T_0)))$$

wherein, n represents the current model, $ACC_{valid}(m)$ represents the validation set precision of the current model, Constraints(m) represents the constraint condition value of the current model, C represents a preset threshold of the constraint condition value, w represents an exponential coefficient of the constraint condition value, $w \in [-\beta, 0]$, $\beta$ represents a zoom factor of w, $\beta > 0$, $\tan h \in (-1, 1)$ represents a monotone increasing hyperbolic tangent function, relu represents an activation function, relu$\geq 0$, $T_0$, $\alpha$, and $\beta$ are externally settable hyperparameters, $T_m$ represents the total number of times or the training set precision corresponding to the current model, on the condition that $T_m$ represents the total number of times corresponding to the current model, $T_0$ represents a preset first time threshold, $T_0 > 0$, $\alpha$ represents a zoom factor of the total number of times corresponding to the current model, $\alpha \in (0, 1)$, on the condition that $T_m$ represents the training set precision corresponding to the current model, $T_0$ represents a preset precision threshold, $T_0 < 1$, $\alpha$ represents a zoom factor of the training set precision corresponding to the current model, and $\alpha \geq 1$.

The validation set may be acquired in the embodiment of the present disclosure, and the validation set precision of the current model is obtained by evaluating the current model on the validation set, correspondingly, calculating the reward value (reward, multi-objective task reward value) may be achieved according to the following formulas:

$$\text{reward} = ACC_{valid}(m) \times \left[\frac{\text{Constraints}(m)}{C}\right]^w$$

$$\text{s.t. } w = -\beta * \text{relu}(\tanh(\alpha(T_m - T_0)))$$

wherein, m represents the subnetwork model (the current model), $ACC_{valid}(n)$ represents the validation set precision of the subnetwork model m, Constraints(m) represents the constraint condition value of the subnetwork model, C represents a preset threshold of the constraint condition value, w represents an exponential coefficient of the constraint condition value, $w \in [-\beta, 0]$, $\beta > 0$ represents a zoom factor of w, $T_0$, $\alpha$, and $\beta$ are externally settable hyperparameters.

Figure 2:
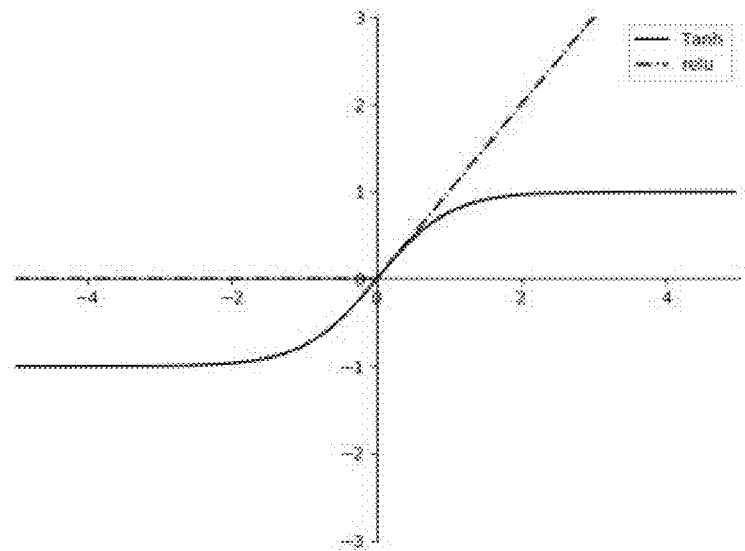
FIG. 2 is a schematic diagram of an activation function of a vehicle recognition method according to an embodiment of the present disclosure.

As shown in FIG. 2, $\tan h \in (-1, 1)$ is a monotone increasing hyperbolic tangent function that can generate nonlinear decision boundaries by nonlinearly combining weighted inputs; relu$\geq 0$ a new activation function proposed in 2012, which has the advantages of increasing the sparsity of the network, solving the gradient dissipation, and having a small amount of computation. The present disclosure uses tan h and relu in combination, which can achieve the purpose of synthesizing the advantages of the two.

Thereinto, there are two specific ways of expressing w (that is, the ways of determining w):

(a) calculating according to the global step:

$T_m$ represents a current global step value (the total number of times corresponding to the current model, that is, the total number of times of training the subnetwork model after determining the current model), $T_0>0$ represents the preset first time threshold, $\alpha \in (0,1)$ represents a zoom factor of the total number of times; specifically, the global step is less than $T_0$ during an initial training, tan $h(\alpha(T_m-T_0))<0$, through the relu function then w=0, at this time, reward controls the model search (in the present disclosure, a process from obtaining the subnetwork model by using the neural network to selecting the optimal network model from all subnetwork models is a process of the model search, the process may specifically be a reinforcement learning search process) mainly based on the precision (ACC), the global step increases as the training goes on, tan $h(\alpha(T_m-T_0)) \in (0,1)$, w attenuates to $-\beta$ in $-\beta$*relu(tan $h(\alpha(T_m-T_0))$) mode, Constraints $(m) < C$, $$\left[\frac{\text{Constraints}(m)}{C}\right]^w > 1,$$

otherwise if

Constraints $(m) > C$, $$\left[\frac{\text{Constraints}(m)}{C}\right]^w < 1,$$

at this time, the model search considers both the precision (ACC) and a speed (in the present disclosure, the constraint conditions are used as the floating-point operations for specific description, and the floating-point operations corresponds to the speed).

(b) calculating according to the training set precision of the subnetwork model:

since the calculation of w according to the global step is greatly affected by the global step, it is difficult to find a time point when the precision converges by setting $T_0$, in order to solve the problem, the training set precision is used to calculate w in the present disclosure. At this moment, $T_m$ represents the training set precision corresponding to the current model (it may be an average precision corresponding to each vehicle image in the training set), $T_0<1$ represents a preset precision threshold, $T_m \in (0,1)$, $T_m-T_0 \in [-T_0, 1-T_0]$, $\alpha \geq 1$ represents a zoom factor of the training set precision; $T_m<T_0$ at the initial training, w=0, the model search is mainly based on the precision, and then w attenuates to $-\beta$ in $-\beta$*relu(tan $h(\alpha(T_m-T_0))$) mode, which may ensure that, when the overall precision converges in the later stage, the proportion of the model search taking into account the constraint conditions becomes larger and larger until the final stage, the proportion remains constant.

In the present disclosure, the adaptive adjustment of conditional constraints is realized through designing a calculation method of w, and the conditional constraints do not work at the initial stage of the training (at this time, calculating reward is just based on the precision to ensure that the precision of the subnetwork model searched in the initial stage is high). The importance of the constraint is increasing with the global step increasing or the training set precision increasing (during the middle stage, when the precision is stable, the constraint conditions begin to adjust the search direction of the model search), and then the influence of the conditional constraints on the reward is also adaptively increased until it reaches the corresponding threshold (within a certain range, gradually strengthen the strength of adjusting the search direction by the constraint conditions), so that the subnetwork model with the highest precision within the constraint conditions may be obtained.

In the vehicle recognition method according to the present disclosure, updating trainable parameters of the neural network by using the reward value, may include:
updating the trainable parameters of the neural network according to the following formula:

$$\theta \leftarrow \theta + \gamma \nabla_\theta \log \pi_\theta(s_t, a_t) \cdot R_t$$

wherein, $\theta$ represents the trainable parameters of the neural network, $\gamma$ represents a preset parameter, $\gamma \nabla_\theta$ represents backpropagation gradients of the trainable parameters, log $\pi_\theta(s_t, a_t)$ represents a cross-entropy of the subnetwork model obtained at the t-th time, and $R_t$ represents the reward value calculated after obtaining the subnetwork model at the t-th time.

In the present disclosure, when the trainable parameters of the controller are updated by feedbacking reward to the controller, the formula of updating the trainable parameters of the controller may be $\theta \leftarrow \theta + \gamma \nabla_\theta \log \pi_\theta(s_t, a_t) \cdot R_t$ (specifically, the value obtained on the right side of the arrow is used to replace the current value of the trainable parameter on the left side of the arrow), thereof, $\theta$ represents the trainable parameters of the controller, $\gamma \nabla_\theta$ represents backpropagation gradients of the trainable parameters, $\gamma$ represents the preset parameter, log $\pi_\theta(s_t, a_t)$ represents a cross-entropy loss corresponding to the subnetwork model obtained at the t-th time. In the embodiment, in order to ensure that the subnetwork model is reliable, it is multiplied by $R_t$ (the reward value corresponding to the subnetwork model obtained at the t-th time) on an original basis, and reward is used to feedback whether the gradient calculated by the cross-entropy is trustworthy; specifically, on the condition that reward is less or negative, it shows that the gradient descent is in a wrong direction and the trainable parameters is needed to be updated in another direction, on the condition that reward is positive or great, it shows that the gradient descent is in a right direction, and the trainable parameters are updated in this direction; thus, the controller may be optimized by updating the trainable parameters, and then the controller may be used to obtain a better subnetwork model.

In the vehicle recognition method according to the present disclosure, training the current model by using the training set to obtain reward parameters may include:
training the current model by using part of the vehicle images and corresponding vehicle information included in the training set;
after selecting an optimal network model from all subnetwork models, the method further includes:
training the optimal network model by using all vehicle images and corresponding vehicle information included in the training set.

It should be noted that, in the present disclosure, in order to speed up the search speed and improve the recognition precision and the recognition performance of the model used for the vehicle recognition, a part of the vehicle images included in the training set and the corresponding vehicle information are just used to realize the training of the subnetworks when searching the models, while after selecting the optimal network model, all the vehicle images included in the training set may be used to training the optimal network model again. Wherein, the amount of the vehicle images and the corresponding vehicle information used in the stage of the model search may be one tenth of the amount of the vehicle images and the corresponding information used to train the optimal network model after the optimal network model is selected, certainly, it may also be set to other settings according to actual needs, which are all within the protection scope of the present disclosure. In addition, after training the optimal network model again by using all the vehicle images included in the training set, the recognition precision of the optimal network model (that is, the testing set precision of the optimal network model) may also be validated on the testing set. On the condition that the recognition precision reaches the corresponding threshold, it is determined that the model training is completed, otherwise, prompt information may be output to the management terminal for corresponding processing by the management terminal.

In the vehicle recognition method according to the present disclosure, the method may further include:
acquiring a testing set, wherein the testing set includes a plurality of vehicle images and corresponding vehicle information, and the vehicle images in the testing set include vehicles located at a designated crossroad;
after training the current model by using the training set to obtain reward parameters, the method further includes:
testing the current model by using the testing set to obtain a testing set precision;
selecting an optimal network model from all subnetwork models includes:
selecting a subnetwork model with a highest testing set precision from all subnetwork models, and determining the subnetwork model with the highest testing set precision as the optimal network model.

When selecting the optimal network model from all subnetwork models, the newly obtained subnetwork model may be directly selected as the optimal network model, that is, the subnetwork model obtained after the trainable parameters of the neural network is updated; but in order to ensure that the recognition precision of the subnetwork model is the highest, in the embodiment, the testing set may be used to obtain the testing set precision of each subnetwork model, and then the subnetwork model with the highest testing set precision is selected as the optimal network model; certainly, other settings according to actual needs are also within the protection scope of the present disclosure.

In the vehicle recognition method according to the present disclosure, determining whether the preset condition is reached may include:
determining whether the total number of times of currently training the subnetwork model reaches a second time threshold, if yes, determining that the preset condition is reached; if no, determining that the preset condition is not reached.

When determining whether the preset condition is reached, it may determine whether there is a subnetwork model whose testing set precision reaches the corresponding threshold in all subnetwork models, if yes, it means that a subnetwork model with higher recognition precision is generated, so it may be determined that the preset condition is reached, otherwise, it is determined that the preset condition is not reached; but this method is obviously more complicated, so in order to further increase the efficiency, the embodiment will count the total number of times of training the subnetwork model, as long as the total number of times reaches the second time threshold set according to actual needs, then it is considered that no more model search is required.

In the vehicle recognition method according to the present disclosure, after obtaining vehicle information of the vehicle images to be recognized outputted by the optimal network model, the method may further include:
on the condition that the vehicle information of the vehicle image to be recognized indicates that a total quantity of the vehicles included in the vehicle image is greater than a quantity threshold, outputting prompt information that the traffic flow is too heavy.

The vehicle information may include the total quantity of the vehicles, therefore, the quantity threshold may be set in advance. On the condition that the total quantity of the vehicles is greater than the quantity threshold, it shows that the traffic flow at the designated crossroad is too heavy. At this time, the prompt information may be output by displaying the corresponding information on the screen or issuing a warning sound, to facilitate the management personnel to know the situation in time and realize traffic management.

Figure 3:
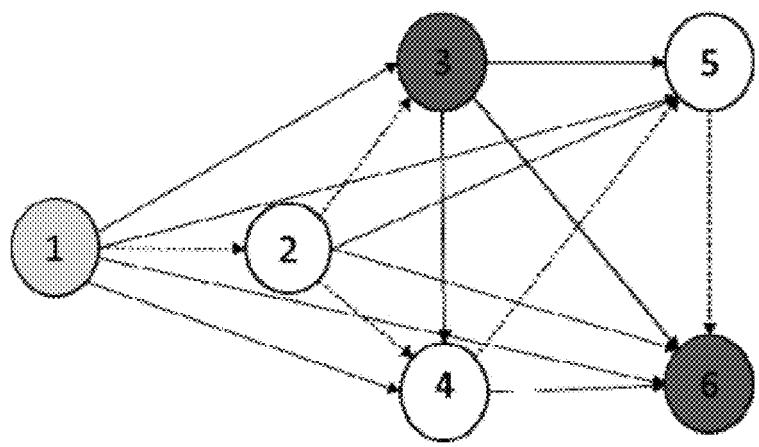
FIG. 3 is an ENAS search space diagram of a vehicle recognition method according to an embodiment of the present disclosure.

In the present disclosure, the model search may be realized by a way of Efficient Neural Architecture Search via Parameter Sharing (ENAS), specifically, the core of the ENAS idea is to use a single directed acyclic graph (DAG) to represent the search space of Neural Architecture Search (NAS). FIG. 3 represents the entire search space of ENAS, and the dashed arrows define one of the models determined by the controller; wherein, nodes represent local computations, edges represent information flow, and local computation of each node has its own parameters that are used only when a particular computation is activated. Here node 1 is the input of the model and node 3 and node 6 are the output of the model. Therefore, in the search space, the design of ENAS allows the parameters to be shared among all submodels (i.e., architectures); ENAS may generate mobile-sized models by repeatedly stacking searched cells.

Correspondingly, on the condition that the conditional constraint is FLOPs, the larger the FLOPs, the slower the model runs, on the contrary, the smaller the FLOPs, the faster the model runs. In ENAS, FLOPs mainly involve three operations: convolution, depth-separable convolution, and full connection. The mainly calculations of FLOPs are as follows:

$$\text{FLOPs} = 2 * K_w * K_h * C_{in} * H * W * C_{out} \quad \text{general convolution:}$$

$$\text{FLOPs} = 2 * (K_w * K_h + C_{out}) * H * W * C_{in} \quad \text{depth-separable convolution:}$$

$$\text{FLOPs} = (2 * C_{in} - 1) * C_{out} \quad \text{full connection:}$$

Wherein, $C_{in}$ and $C_{out}$ are an input channel quantity and an output channel quantity, respectively, $K_w$ and $K_h$ are kernel sizes; H and W are sizes of output feature maps.

Figure 4:
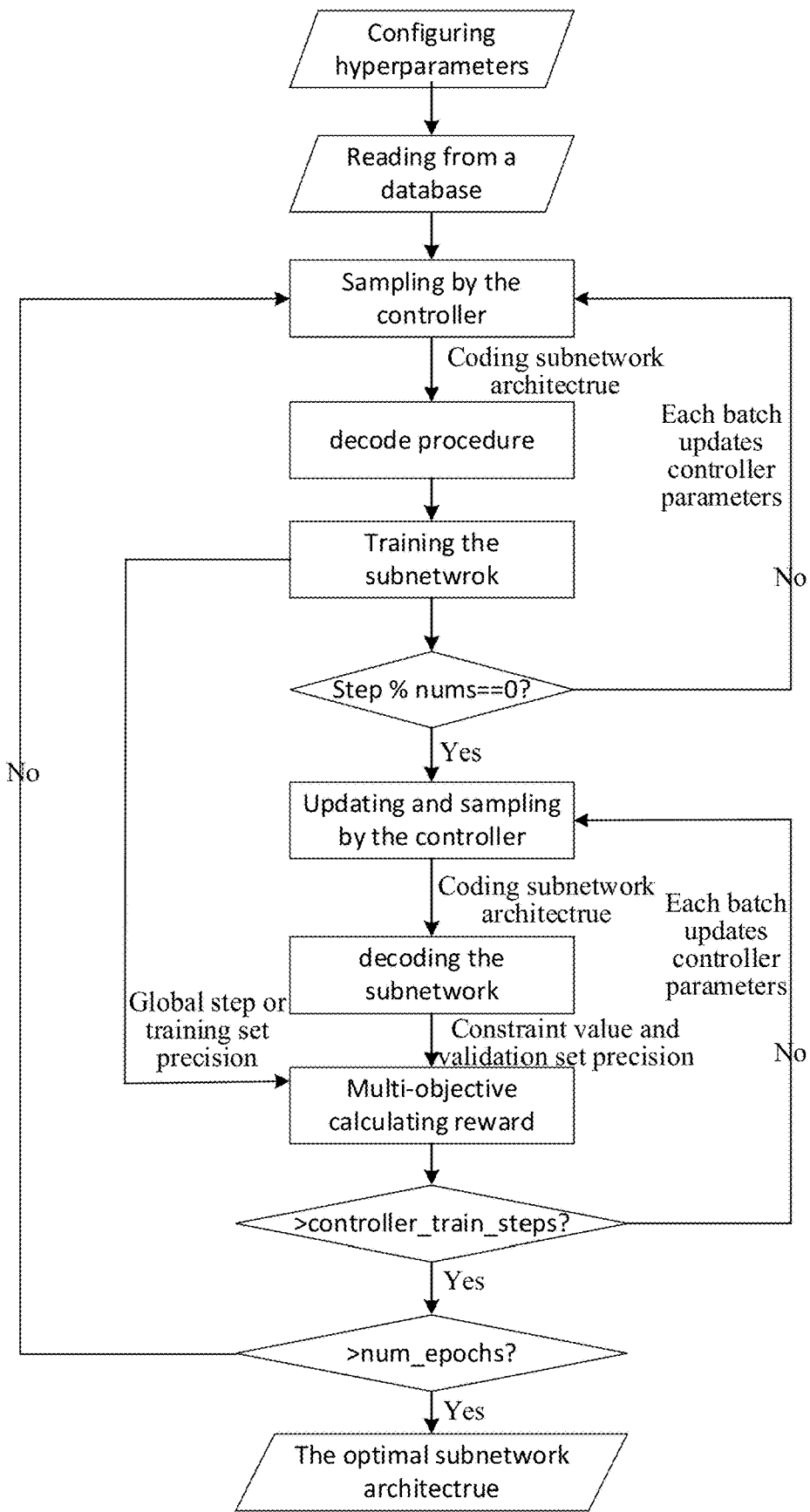
FIG. 4 is a flow chart of a model search of a vehicle recognition method according to an embodiment of the present disclosure.
Figure 5:
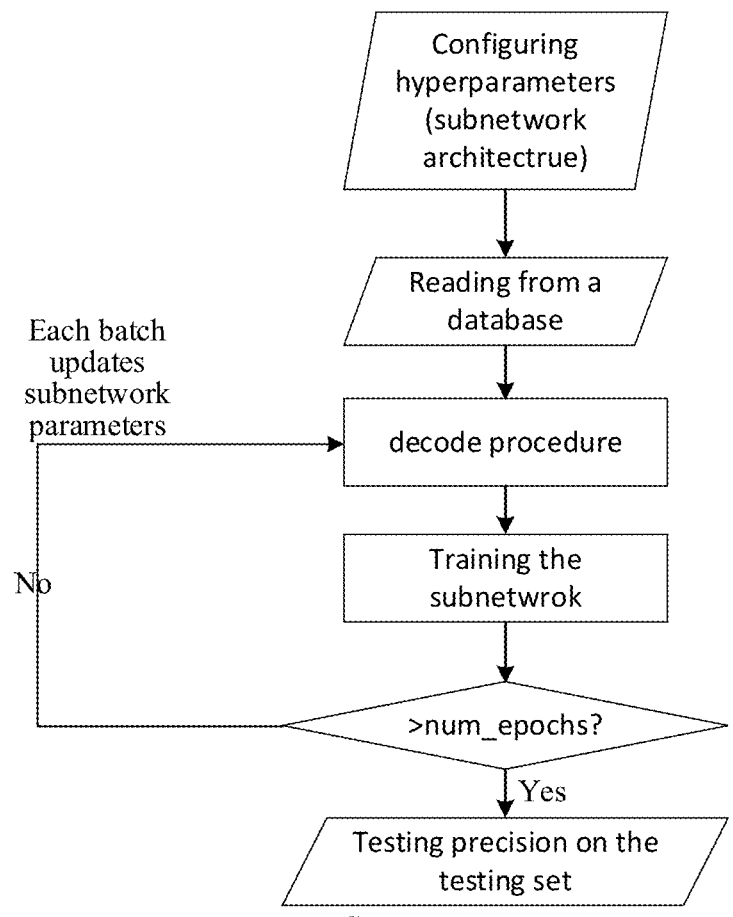
FIG. 5 is a flow chart for re-training an optimal network model of a vehicle recognition method according to an embodiment of the present disclosure.

In a specific implementation, the operation on the data set in the present disclosure may be divided into two stages: the model search (from obtaining the subnetwork model by using the neural network to selecting the optimal network model from all subnetwork models) and the model evaluation (training and testing the optimal network model). In the model search stage, the subnetwork architecture is searched, and the optimal network model is determined according to their validation performance, as shown in FIG. 4 (where the subnetwork is the subnetwork model, the optimal subnetwork architecture is the optimal subnetwork model, the constraint value is the conditional constraint value, and the control parameter is the trainable parameter of the controller); in the model evaluation stage, the optimal network model is trained from start, and its performance is reported on the testing set, as shown in FIG. 5 (where the subnetwork is the subnetwork model).

In another specific implementation manner, in the present disclosure, the optimal network model may be used to recognize the vehicle information such as vehicle quantity, vehicle type, and body color in real time, thereby achieving functions such as monitoring, alarming, and forecasting. The specific implementation operations may be as follows:

1. collecting vehicle images and vehicle information of different crossroads, the data at each crossroad (including the vehicle images and the vehicle information) form a database separately, and performing the following operations for each database in turn:
   (1) initialization input; in detail, the initialization input includes configuring hyperparameters and reading a data set read from the database, the hyperparameters may include subnetwork hyperparameters and controller hyperparameters, and the data set includes the training set, the validation set and the testing set;
   (2) regarding RNN network as the controller, and learning and sampling to output the subnetwork architecture;
   (3) establishing the subnetwork model by using the decoder according to the subnetwork architecture;
   (4) training the subnetwork model on the training set, and evaluating the subnetwork model on the validation set and the testing set, respectively, then the global step or the training set precision is output, and the validation set precision and the testing set precision are also output;
   (5) calculating its constraint condition value according to the subnetwork model; the constraint condition generally refers to indicators that measure an operating speed of the model, such as floating-point operations (FLOPs) or parameters (param) and so on;
   (6) calculating the reward value reward of the multi-objective task reward corresponding to the subnetwork model;
   wherein, the calculation formula of reward may be:

$$\text{reward} = ACC_{valid}(m) \times \left[\frac{\text{Constraints}(m)}{C}\right]^w$$

$$\text{s.t. } w = -\beta * \text{relu}(\tanh(\alpha(T_m - T_0)))$$

(7) feedbacking reward to the controller, and updating the trainable parameters of the controller;
   wherein, the formula of updating the trainable parameters of the controller may be $\theta \leftarrow \theta + \gamma \nabla_\theta \log \pi_\theta(s_t, a_t) \cdot R_t$;
   (8) repeating the above operations (2)-(7) for preset times (that is, the second time threshold), and the testing set precision within the preset times is regarded as the searched optimal network model.

2. Training the optimal network models of different crossroads, respectively, after the training is completed, deploying them into cameras of corresponding crossroads, and monitoring road conditions at different crossroads in real time.

Wherein, when the crossroads are similar and the camera types are the same, one optimal network model may be shared; and, after the training is completed, the corresponding checkpoint (CKPT) or protocol buffer (PB) model file may be output, and the user can load the CKPT or PB model file to use the optimal network model it contains.

Figure 6:
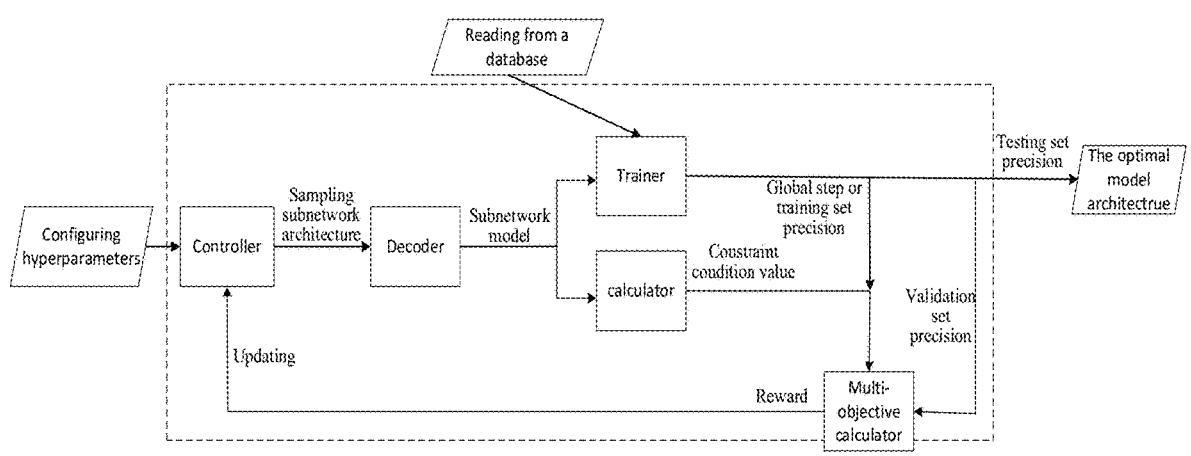
FIG. 6 is an overall flow diagram of a vehicle recognition method according to an embodiment of the present disclosure.

In yet another specific implementation, the technical solution of the present disclosure may be mainly realized through five parts, as shown in FIG. 6 (where the optimal model architecture is the optimal network model): a controller that learns and samples the subnetwork architecture, a decoder that establishes the subnetwork model, a trainer that trains the subnetwork model to obtain precision, a calculator that calculates the constraint condition values of the subnetwork model, and a multi-objective calculator that calculates reward of the subnetwork model.

It can be seen from the above embodiments that, in the present disclosure, a multi-objective neural architecture search method based on reinforcement learning is used when implementing model training in the vehicle recognition. By incorporating the adaptive constraint conditions into the model search process, the constraints may be adaptively adjusted according to the feedback of the training process, and the precision and speed of the model may be automatically balanced to the greatest extent, so that a high-precision model can be found under the constraint conditions, which not only saves a lot of manpower and time, but also can flexibly and automatically adjust the architecture of the neural network according to different scenario tasks and constraint conditions. Therefore, the present disclosure can achieve vehicle recognition with better precision and performance.

In addition, since the camera is a mobile device with limited computing resources, and there are many types of the cameras, the imaging effects are also very different, and the traffic conditions at each crossroad are also very different; experiments prove that through the present disclosure, the corresponding optimal model for different crossroads may be designed to achieve the vehicle recognition, with outperforming human models in both precision and performance.

It should be noted that, the technical solutions provided in the embodiments of the present disclosure may also be applied to weather condition recognition at crossroads, pedestrian recognition at crossroads, etc., certainly, in addition to applying adaptive constraint search in these target classification fields, it is also suitable for adaptive constraint search in target detection and target segmentation fields.

Figure 7:
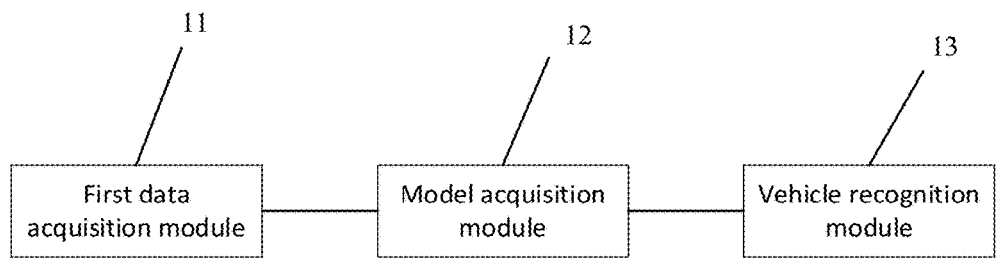
FIG. 7 is a schematic structural diagram of a vehicle recognition apparatus according to an embodiment of the present disclosure.

The embodiment of the present disclosure also provides a vehicle recognition apparatus, as shown in FIG. 7, it may include:
   a first data acquisition module 11, configured for acquiring a training set, wherein the training set includes a plurality of vehicle images and corresponding vehicle information, and the vehicle images in the training set include vehicles located at a designated crossroad;
   a model acquisition module 12, configured for using a neural network for learning and sampling to obtain a subnetwork model, determining the subnetwork model to be a current model, and training the current model by using the training set to obtain reward parameters, wherein the reward parameters include a training set precision or a total number of times of training the subnetwork model; calculating a constraint condition value of the current model, calculating a reward value based on the constraint condition value and the reward parameters, updating trainable parameters of the neural network by using the reward value, returning to perform the operation of using a neural network for learning and sampling to obtain a subnetwork model until a preset condition is reached; and after the preset condition is reached, selecting an optimal network model from all subnetwork models; and a vehicle recognition module 13 configured for, on the condition that a vehicle recognition is required to be realized, inputting vehicle images to be recognized to the optimal network model, to obtain vehicle information of the vehicle images to be recognized outputted by the optimal network model.

The vehicle recognition apparatus provided by the embodiment of the present disclosure may further include:

a second data acquisition module, configured for acquiring a validation set, wherein the validation set includes a plurality of vehicle images and corresponding vehicle information, and the vehicle images in the validation set include vehicles located at a designated crossroad;

a validation module, configured for validating the current model by using the validation set to obtain a validation set precision after training the current model by using the training set to obtain reward parameters;

the model acquisition module may include:

a reward calculation unit, configured for calculating the reward value reward according to the following formulas:

$$\text{reward} = ACC_{valid}(m) \times \left[\frac{\text{Constraints}(m)}{C}\right]^w$$

$$\text{s.t. } w = -\beta * \text{relu}(\tanh(\alpha(T_m - T_0)))$$

wherein, m represents the current model, $ACC_{valid}(m)$ represents the validation set precision of the current model, Constraints(m) represents the constraint condition value of the current model, C represents a preset threshold of the constraint condition value, w represents an exponential coefficient of the constraint condition value, $w \in [-\beta, 0]$, $\beta$ represents a zoom factor of w, $\beta > 0$, $\tan h \in (-1,1)$ represents a monotone increasing hyperbolic tangent function, relu represents an activation function, relu$\geq 0$, $T_0$, $\alpha$, and $\beta$ are externally settable hyperparameters, $T_m$ represents the total number of times or the training set precision corresponding to the current model, on the condition that $T_m$ represents the total number of times corresponding to the current model, $T_0$ represents a preset first time threshold, $T_0 > 0$, $\alpha$ represents a zoom factor of the total number of times corresponding to the current model, $\alpha \in (0,1)$, on the condition that $T_m$ represents the training set precision corresponding to the current model, $T_0$ represents a preset precision threshold, $T_0 < 1$, $\alpha$ represents a zoom factor of the training set precision corresponding to the current model, and $\alpha \geq 1$.

The embodiment of the present disclosure also provides a vehicle recognition apparatus, the model acquisition module may include:

a parameter updating unit, configured for updating the trainable parameters of the neural network according to the following formula:

$$\theta \leftarrow \theta + \gamma \nabla_\theta \log \pi_\theta(s_t, a_t) \cdot R_t$$

wherein, $\theta$ represents the trainable parameters of the neural network, $\gamma$ represents a preset parameter, $\gamma \nabla_\theta$ represents backpropagation gradients of the trainable parameters, $\log \pi_\theta(s_t, a_t)$ represents a cross-entropy of the subnetwork model obtained at the t-th time, and $R_t$ represents the reward value calculated after obtaining the subnetwork model at the t-th time.

The embodiment of the present disclosure also provides a vehicle recognition apparatus, the model acquisition module may include:

a model training unit, configured for training the current model by using part of the vehicle images and corresponding vehicle information included in the training set;

the vehicle recognition apparatus may further include:

a model training module, configured for training the optimal network model by using all vehicle images and corresponding vehicle information included in the training set after selecting an optimal network model from all subnetwork models.

The vehicle recognition apparatus provided by the embodiment of the present disclosure may further include:

a third data acquisition model, configured for acquiring a testing set, wherein the testing set includes a plurality of vehicle images and corresponding vehicle information, and the vehicle images in the testing set include vehicles located at a designated crossroad;

the vehicle recognition apparatus may further include:

a testing model, configured for testing the current model by using the testing set to obtain a testing set precision after training the current model by using the training set to obtain reward parameters;

the model acquisition model may include:

a selection unit, configured for selecting a subnetwork model with a highest testing set precision from all subnetwork models, and determining the subnetwork model with the highest testing set precision as the optimal network model.

In the vehicle recognition apparatus provided by the embodiment of the present disclosure, the model acquisition model may include:

a determining unit, configured for determining whether the total number of times of currently training the subnetwork model reaches a second time threshold, if yes, determining that the preset condition is reached; if no, determining that the preset condition is not reached.

The vehicle recognition apparatus provided by the embodiment of the present disclosure may further include:

a prompt unit configured for, after obtaining vehicle information of the vehicle images to be recognized outputted by the optimal network model, on the condition that the vehicle information of the vehicle image to be recognized indicates that a total quantity of the vehicles included in the vehicle image is greater than a quantity threshold, outputting prompt information that the traffic flow is too heavy.

The embodiment of the present disclosure further provides a vehicle recognition device, which may include:

a memory, configured for storing a computer program; and a processor, configured for implementing the operations of the vehicle recognition method according to any one of the above embodiments when executing the computer program.

The embodiment of the present disclosure further provides a computer-readable storage medium, a computer program is stored on the computer-readable storage medium, and when the computer program is executed by a processor, the operations of the vehicle recognition method according to any one of the above embodiments are implemented.

The apparatuses, devices, etc. disclosed in the embodiments of the present disclosure may be various electronic terminal devices, such as mobile phones, personal digital assistants (PDAs), tablet computers (PADs), smart TVs, etc., or large-scale terminal devices, such as servers, etc. Therefore, the protection scope disclosed by the embodiments of the present disclosure should not be limited to a certain type of apparatus or equipment.

The computer-readable storage medium (e.g., memory) herein may be volatile memory or non-volatile memory, or may include both volatile and non-volatile memory. By way of example and not limitation, the non-volatile memory may include Read-Only Memory (ROM), Programmable ROM (PROM), Electrically Programmable ROM (EPROM), Electrically Erasable Programmable ROM (EEPROM) or flash memory. The volatile memory may include Random Access Memory (RAM), which may act as external cache memory. By way of example and not limitation, RAM can be obtained in various forms, such as Synchronous RAM (DRAM, Synchronous Random Access Memory), dynamic RAM (DRAM, Dynamic Random Access Memory), synchronous DRAM (SDRAM, Synchronous Dynamic Random Access Memory), double data rate SDRAM (DDR SDRAM, Double Data Rate Synchronous Dynamic Random Access Memory), enhanced SDRAM (ESDRAM, Enhanced Synchronous Dynamic Random Access Memory), synchronous link DRAM (SLDRAM, Sync Link Dynamic Random Access Memory), and direct Rambus RAM (DRRAM, Direct Rambus Random Access Memory). The storage devices of the disclosed aspects are intended to include, but not be limited to, these and other suitable types of memory.

It should be noted that, for the description of the relevant parts of the vehicle recognition apparatus, device, and storage medium provided by the embodiments of the present disclosure, please refer to the detailed description of the corresponding parts of the vehicle recognition method provided by the embodiments of the present disclosure, and will not be repeated here. In addition, the parts of the above-mentioned technical solutions provided in the embodiments of the present disclosure that are consistent with the implementation principles of the corresponding technical solutions in the prior art are not described in detail, to avoid redundant description.

The above description of the disclosed embodiments enables any person skilled in the art to make or use the present disclosure. Various modifications to these embodiments will be readily apparent to those skilled in the art, and the generic principles defined herein may be implemented in other embodiments without departing from the spirit or scope of the present disclosure. Thus, the present disclosure is not intended to be limited to the embodiments shown herein, but is to be accorded the widest scope consistent with the principles and novel features disclosed herein.

The invention claimed is:

1. A vehicle recognition method, wherein the method comprises:
acquiring, by a processor for vehicle recognition, a training set, wherein the training set comprises a plurality of vehicle images and corresponding vehicle information, and the plurality of vehicle images in the training set include vehicles located at a designated crossroad;
performing learning and sampling by a neural network of a controller to obtain a vehicle recognition discriminator, and training the vehicle recognition discriminator by using the training set to obtain reward parameters, wherein the reward parameters comprise a training set precision or a total number of times of training the vehicle recognition discriminator;
calculating a constraint condition value of the vehicle recognition discriminator, calculating a reward value based on the constraint condition value and the reward parameters, updating trainable parameters of the neural network of the controller by using the reward value, returning to perform the operation of using the neural network for learning and sampling to obtain a vehicle recognition discriminator until a preset condition is reached; and after the preset condition is reached, selecting an optimal vehicle recognition discriminator from all vehicle recognition discriminators; and
inputting vehicle images to be recognized to the optimal vehicle recognition discriminator, to obtain vehicle information of the vehicle images to be recognized outputted by the optimal vehicle recognition discriminator.

2. The method according to claim 1, wherein the method further comprises:
acquiring a validation set, wherein the validation set comprises a plurality of vehicle images and corresponding vehicle information, and the plurality of vehicle images in the validation set include vehicles located at a designated crossroad;
after training the vehicle recognition discriminator by using the training set to obtain reward parameters, the method further comprises:
validating the vehicle recognition discriminator by using the validation set to obtain a validation set precision;
calculating a reward value based on the constraint condition value and the reward parameters comprises:
calculating the reward value reward according to the following formulas:

$$\text{reward} = ACC_{valid}(m) \times \left[\frac{\text{Constraints}(m)}{C}\right]^w$$

$$\text{s.t. } w = -\beta * \text{relu}(\tanh(\alpha(T_m - T_0)))$$

wherein, m represents the vehicle recognition discriminator, $ACC_{valid}(m)$ represents the validation set precision of the vehicle recognition discriminator, Constraints(m) represents the constraint condition value of the vehicle recognition discriminator, C represents a preset threshold of the constraint condition value, w represents an exponential coefficient of the constraint condition value, $w \in [-\beta, 0]$, $\beta$ represents a zoom factor of w, $\beta > 0$, $\tan h \in (-1, 1)$ represents a monotone increasing hyperbolic tangent function, relu represents an activation function, $\text{relu} \geq 0$, $T_0$, $\alpha$, and $\beta$ are externally settable hyperparameters, $T_m$ represents the total number of times or the training set precision corresponding to the vehicle recognition discriminator, on the condition that $T_m$ represents the total number of times corresponding to the current model, $T_0$ represents a preset first time threshold, $T_0 > 0$, $\alpha$ represents a zoom factor of the total number of times corresponding to the vehicle recognition discriminator, $\alpha \in (0, 1)$ on the condition that $T_m$ represents the training set precision corresponding to the vehicle recognition discriminator, $T_0$ represents a preset precision threshold, $T_0 < 1$, $\alpha$ represents a zoom factor of the training set precision corresponding to the vehicle recognition discriminator, and $\alpha \geq 1$.

3. The method according to claim 2, wherein updating trainable parameters of the neural network by using the reward value comprises:
updating the trainable parameters of the neural network according to the following formula:

$$\theta \leftarrow \theta + \gamma \nabla_\theta \log \pi_\theta(s_t, a_t) \cdot R_t$$

wherein, θ represents the trainable parameters of the neural network, γ represents a preset parameter, $\gamma \nabla_\theta$ represents backpropagation gradients of the trainable parameters, $\log \pi_\theta(s_t, a_t)$ represents a cross-entropy of the vehicle recognition discriminator obtained at the t-th time, and $R_t$ represents the reward value calculated after obtaining the vehicle recognition discriminator at the t-th time.

4. The method according to claim 2, wherein ways of determining w comprise:
   calculating according to a global step or calculating according to the training set precision of the vehicle recognition discriminator.

5. The method according to claim 3, wherein training the vehicle recognition discriminator by using the training set to obtain reward parameters comprises:
   training the vehicle recognition discriminator by using part of the plurality of vehicle images and corresponding vehicle information included in the training set;
   after selecting an optimal vehicle recognition discriminator from all vehicle recognition discriminators, the method further comprises:
   training the optimal vehicle recognition discriminator by using all vehicle images and corresponding vehicle information included in the training set.

6. The method according to claim 5, wherein the method further comprises:
   acquiring a testing set, wherein the testing set comprises a plurality of vehicle images and corresponding vehicle information, and the plurality of vehicle images in the testing set include vehicles located at a designated crossroad;
   after training the vehicle recognition discriminator by using the training set to obtain reward parameters, the method further comprises:
   testing the vehicle recognition discriminator by using the testing set to obtain a testing set precision;
   selecting an optimal vehicle recognition discriminator from all vehicle recognition discriminators comprises:
   selecting a vehicle recognition discriminator with a highest testing set precision from all vehicle recognition discriminators, and determining the vehicle recognition discriminator with the highest testing set precision as the optimal vehicle recognition discriminator.

7. The method according to claim 6, wherein determining whether the preset condition is reached comprises:
   determining whether the total number of times of currently training the vehicle recognition discriminator reaches a second time threshold, if it is, determining that the preset condition is reached; if not, determining that the preset condition is not reached.

8. The method according to claim 6, wherein the plurality of vehicle images included in the training set, the plurality of vehicle images included in the validation set and the plurality of vehicle images included in the testing set are different from each other.

9. The method according to claim 6, wherein before acquiring a training set, the method further comprises:
   performing an initialization input, wherein the initialization input includes configuring hyperparameters and reading a data set from a database, the hyperparameters include subnetwork hyperparameters and controller hyperparameters, and the data set includes the training set, the validation set and the testing set.

10. The method according to claim 7, wherein after obtaining vehicle information of the vehicle images to be recognized outputted by the optimal vehicle recognition discriminator, the method further comprises:
   on the condition that the vehicle information of the vehicle image to be recognized indicates that a total quantity of the vehicles included in the vehicle image is greater than a quantity threshold, outputting prompt information that the traffic flow is too heavy.

11. The method according to claim 1, wherein performing learning and sampling by the neural network to obtain a vehicle recognition discriminator comprises:
   performing learning and sampling by the neural network to output a subnetwork architecture; and
   decoding the subnetwork architecture by a preset decoder into the vehicle recognition discriminator that is capable of being recognized by a vehicle recognition device.

12. The method according to claim 1, wherein the total number of times of training the vehicle recognition discriminator is the total number of times of training the vehicle recognition discriminator from the first time when the vehicle recognition discriminator is obtained to a current moment; and
   after each training of the vehicle recognition discriminator, a current value of the total number of times before each training plus 1 is regarded as the current value of the total number of times.

13. A vehicle recognition device, wherein the device comprises:
   a memory, configured for storing a computer program; and
   a processor, configured for implementing the operations comprising:
   acquiring, by a processor for vehicle recognition, a training set, wherein the training set comprises a plurality of vehicle images and corresponding vehicle information, and the plurality of vehicle images in the training set include vehicles located at a designated crossroad;
   performing learning and sampling by a neural network of a controller to obtain a vehicle recognition discriminator, and training the vehicle recognition discriminator by using the training set to obtain reward parameters, wherein the reward parameters comprise a training set precision or a total number of times of training the vehicle recognition discriminator;
   calculating a constraint condition value of the vehicle recognition discriminator, calculating a reward value based on the constraint condition value and the reward parameters, updating trainable parameters of the neural network of the controller by using the reward value, returning to perform the operation of using the neural network for learning and sampling to obtain a vehicle recognition discriminator until a preset condition is reached; and after the preset condition is reached, selecting an optimal vehicle recognition discriminator from all vehicle recognition discriminators; and
   inputting vehicle images to be recognized to the optimal vehicle recognition discriminator, to obtain vehicle information of the vehicle images to be recognized outputted by the optimal vehicle recognition discriminator.

14. The vehicle recognition device according to claim 13, wherein the operations further comprise:
   acquiring a validation set, wherein the validation set comprises a plurality of vehicle images and corresponding vehicle information, and the plurality of vehicle images in the validation set include vehicles located at a designated crossroad;

after the operation of training the vehicle recognition discriminator by using the training set to obtain reward parameters, the operations further comprise:
validating the vehicle recognition discriminator by using the validation set to obtain a validation set precision;
the operation of calculating a reward value based on the constraint condition value and the reward parameters comprises:
calculating the reward value reward according to the following formulas:

$$\text{reward} = ACC_{valid}(m) \times \left[\frac{\text{Constraints}(m)}{C}\right]^w$$

$$\text{s.t. } w = -\beta * \text{relu}(\tanh(\alpha(T_m - T_0)))$$

wherein, m represents the vehicle recognition discriminator, $ACC_{valid}(m)$ represents the validation set precision of the vehicle recognition discriminator, Constraints(m) represents the constraint condition value of the vehicle recognition discriminator, C represents a preset threshold of the constraint condition value, w represents an exponential coefficient of the constraint condition value, $w \in [-\beta, 0]$, $\beta$ represents a zoom factor of w, $\beta > 0$, $\tan h \in (-1, 1)$ represents a monotone increasing hyperbolic tangent function, r represents an activation function, $\text{relu} \geq 0$, $T_0$, $\alpha$, and $\beta$ are externally settable hyperparameters, $T_m$ represents the total number of times or the training set precision corresponding to the vehicle recognition discriminator, on the condition that $T_m$ represents the total number of times corresponding to the vehicle recognition discriminator, $T_0$ represents a preset first time threshold, $T_0 > 0$, $\alpha$ represents a zoom factor of the total number of times corresponding to the vehicle recognition discriminator, $\alpha \in (0,1)$, on the condition that $T_m$ represents the training set precision corresponding to the vehicle recognition discriminator, $T_0$ represents a preset precision threshold, $T_0 < 1$, $\alpha$ represents a zoom factor of the training set precision corresponding to the vehicle recognition discriminator, and $\alpha \geq 1$.

15. The vehicle recognition device according to claim 14, wherein the operation of updating trainable parameters of the neural network by using the reward value comprises:
updating the trainable parameters of the neural network according to the following formula:

$$\theta \leftarrow \theta + \gamma \nabla_\theta \log \pi_\theta(s_t, a_t) \cdot R_t$$

wherein, $\theta$ represents the trainable parameters of the neural network, $\gamma$ represents a preset parameter, $\gamma \nabla_\theta$ represents backpropagation gradients of the trainable parameters, $\log \pi_\theta(s_t, a_t)$ represents a cross-entropy of the vehicle recognition discriminator obtained at the t-th time, and $R_t$ represents the reward value calculated after obtaining the vehicle recognition discriminator at the t-th time.

16. The vehicle recognition device according to claim 15, wherein the operation of training the vehicle recognition discriminator by using the training set to obtain reward parameters comprises:
training the vehicle recognition discriminator by using part of the plurality of vehicle images and corresponding vehicle information included in the training set;
after the operation of selecting an optimal vehicle recognition discriminator from all vehicle recognition discriminators, the operations further comprise:
training the optimal vehicle recognition discriminator by using all vehicle images and corresponding vehicle information included in the training set.

17. The vehicle recognition device according to claim 16, wherein the operations further comprise:
acquiring a testing set, wherein the testing set comprises a plurality of vehicle images and corresponding vehicle information, and the plurality of vehicle images in the testing set include vehicles located at a designated crossroad;
after the operation of training the vehicle recognition discriminator by using the training set to obtain reward parameters, the operations further comprise:
testing the vehicle recognition discriminator by using the testing set to obtain a testing set precision;
the operation of selecting an optimal vehicle recognition discriminator from all vehicle recognition discriminators comprises:
selecting a vehicle recognition discriminator with a highest testing set precision from all vehicle recognition discriminators, and determining the vehicle recognition discriminator with the highest testing set precision as the optimal vehicle recognition discriminator.

18. The vehicle recognition device according to claim 17, wherein the operation of determining whether the preset condition is reached comprises:
determining whether the total number of times of currently training the vehicle recognition discriminator reaches a second time threshold, if it is, determining that the preset condition is reached; if not, determining that the preset condition is not reached.

19. The vehicle recognition device according to claim 18, wherein after the operation of obtaining vehicle information of the vehicle images to be recognized outputted by the optimal vehicle recognition discriminator, the operations further comprise:
on the condition that the vehicle information of the vehicle image to be recognized indicates that a total quantity of the vehicles included in the vehicle image is greater than a quantity threshold, outputting prompt information that the traffic flow is too heavy.

20. A non-transitory computer-readable storage medium, wherein a computer program is stored on the computer-readable storage medium, and when the computer program is executed by a processor, implementing the operations comprising:
acquiring, by a processor for vehicle recognition, a training set, wherein the training set comprises a plurality of vehicle images and corresponding vehicle information, and the plurality of vehicle images in the training set include vehicles located at a designated crossroad;
performing learning and sampling by a neural network of a controller to obtain a vehicle recognition discriminator, and training the vehicle recognition discriminator by using the training set to obtain reward parameters, wherein the reward parameters comprise a training set precision or a total number of times of training the vehicle recognition discriminator;
calculating a constraint condition value of the vehicle recognition discriminator, calculating a reward value based on the constraint condition value and the reward parameters, updating trainable parameters of the neural network of the controller by using the reward value, returning to perform the operation of using the neural network for learning and sampling to obtain a vehicle recognition discriminator until a preset condition is reached; and after the preset condition is reached, selecting an optimal vehicle recognition discriminator from all vehicle recognition discriminators; and inputting vehicle images to be recognized to the optimal vehicle recognition discriminator, to obtain vehicle information of the vehicle images to be recognized outputted by the optimal vehicle recognition discriminator.

\* \* \* \* \*